J. W. GRIMES.
SULKY-PLOW.

No. 179,014.   Patented June 20, 1876.

WITNESSES:   INVENTOR:
   John W. Grimes
   BY
   ATTORNEYS.

UNITED STATES PATENT OFFICE.

JOHN W. GRIMES, OF APPLETON CITY, MISSOURI.

IMPROVEMENT IN SULKY-PLOWS.

Specification forming part of Letters Patent No. 179,014, dated June 20, 1876; application filed April 28, 1876.

*To all whom it may concern:*

Be it known that I, JOHN W. GRIMES, of Appleton City, in the county of St. Clair and State of Missouri, have invented a new and useful Improvement in Sulky-Plows; and I do hereby declare that the following is a full, clear, and exact description of the same.

My invention is an improvement in the class of sulky-plows in which the plow proper is suspended from the wheeled frame in such manner as adapts it to be raised and lowered at will for the purpose of changing the depth of furrow, or for holding the plow entirely off the ground while being transported from one point to another.

The improvement relates particularly to a slotted draft-bar, which is pivoted to a pendant of the frame and connected with the vertically-adjustable plow-beam, as hereinafter described and claimed.

Figure 1:
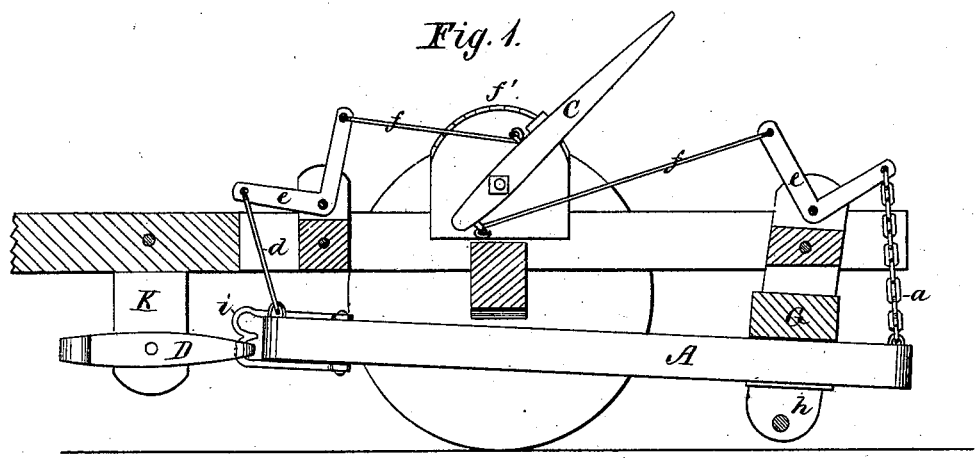
Figures 2, 3:
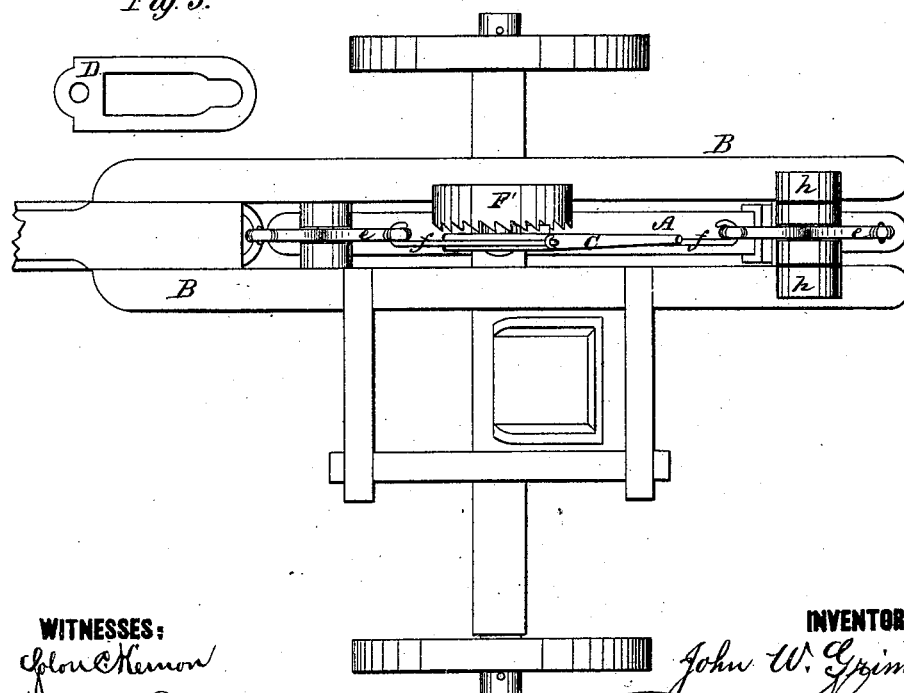

In the accompanying drawing, forming part of this specification, Figure 1 is a side elevation, and Fig. 2 a plan view, of my improved plow. Fig. 3 is a plan view of the slotted draft-bar.

The plow-beam A is suspended from the wheeled frame B by means of links, or link and chain, $a\ a$, attached to the respective ends of the beam, elbow-levers $e$, and links $f$ connecting the latter, $e$, with the hand-lever C above and below its fulcrum, as shown. The lever is pivoted to a vertical support on the frame B, and engages a ratchet-bar, $f'$, by which it is held locked in any adjustment. The main portion of the frame B is formed of two parallel bars, and the plow-suspending chain and link work in the slot or space between them. A block, $g$, is rigidly attached to the rear end of the plow-beam A, to hold the same steady in its vertical movement between the parallel guides $h$, which are pendent from the frame B. A clevis, $i$, is attached to the front end of the beam, and forms the connection with the slotted bar D, which is pivoted centrally to the pendent arm $k$ of the frame B. The clevis may be adjusted to change the point of connection with the bar D higher or lower, as required by the nature of the soil to be plowed, the depth of furrow, the kind of crop to be put in, &c. The team is attached to the front end of bar D, and thus, in the plowing operation, the draft is simultaneously applied to the plow and sulky proper. Said bar, being pivoted as described, likewise adapts itself to variations in the position or adjustment of the plow-beam, incident to the natural operation of the plow, or occasioned by positive adjustment of the plow-beam by means of the link, lever, and ratchet mechanism. The plow proper may be such as is commonly employed, and the axle to which frame B is attached may be adapted to receive the front wheels of an ordinary farm-wagon. Thus the farmer may provide himself with an efficient sulky-plow at minimum expense, namely, the cost of constructing the woodwork or frame B and the axle.

What I claim is—

The slotted draft-bar D, pivoted to the pendant $k$ of the frame B, in combination with the plow-beam $c$, and mechanism $a\ d\ e\ f$ C, for adjusting the same vertically, as shown and described.

JOHN W. GRIMES.

Witnesses:
 LEVI LANKTON FAY, Jr.,
 GILES ANDREWS.